(12) United States Patent
Ning

(10) Patent No.: US 7,023,628 B1
(45) Date of Patent: Apr. 4, 2006

(54) COMPACT FISHEYE OBJECTIVE LENS

(76) Inventor: Alex Ning, 2122 Sea Island Pl., San Marcos, CA (US) 92078

( * ) Notice: Subject to any disclaimer, the term of this patent is extended or adjusted under 35 U.S.C. 154(b) by 0 days.

(21) Appl. No.: 11/100,195

(22) Filed: Apr. 5, 2005

(51) Int. Cl.
*G02B 9/34* (2006.01)

(52) U.S. Cl. ............... 359/781; 359/774; 359/680; 359/687

(58) Field of Classification Search ........... 359/781, 359/774, 680, 784, 689, 690, 687, 691, 782
See application file for complete search history.

(56) References Cited

U.S. PATENT DOCUMENTS 5,552,937 A * 9/1996 Ono et al. .............. 359/691

6,781,770 B1 * 8/2004 Chang et al. ............ 359/689

\* cited by examiner

*Primary Examiner*—Timothy Thompson
(74) *Attorney, Agent, or Firm*—James F. Kirk

(57) ABSTRACT

A six element fisheye objective lens comprising a first lens element having a convex object surface facing the object and a concave image surface facing the image plane, a second lens element having a convex object surface facing the object and a concave image facing the image plan. A third lens element has a positive power. A positively powered lens group has a positively powered cemented doublet lens pair. A singlet lens element has a positive power, The lens group has an object surface facing the object and an image surface facing the image. The ratio of the total track to the focal length satisfies the condition that 8<TT/fo<15. The fisheye objective lens has an optical axis, the first, second, third and the lens group being coaxially aligned on the optical axis.

15 Claims, 4 Drawing Sheets

COMPACT FISHEYE OBJECTIVE LENS

FIELD OF THE INVENTION

This invention relates to compact lenses for digital camera applications and, in particular, to very wide angle or fisheye lenses for very compact digital cameras. Such lens designs are incorporated into security cameras and other very small electronic devices.

BACKGROUND OF THE INVENTION

An objective lens with a field of view of about 180 deg (+/−10 deg) is called a fisheye lens. Fisheye lenses are commonly used for security and surveillance applications. New emerging applications include back-up cameras for cars, and interior monitoring cameras for buses and airplanes. Since low light performance of an objective lens is important, the relative aperture of the lens must also be high. Lens relative aperture (also known as f/# of the lens) less or equal to 3 is generally preferred. There is also a need for small size and low weight for many emerging applications. The image quality of the lens must also be high for compatibility with mega pixel class electronic imagers.

Prior art fisheye lenses such as P/N: DF1.8HB marketed by Fujinon in Japan use a large number of lens elements to meet the performance needs (field of view, aperture and high image quality). However, because of the large number of elements used, the lens assembly is large and heavy. They are also expensive to produce due to the use of a large number of lens elements. Examples of prior art fisheye lens designs are U.S. Pat. Nos. 3,589,798, 3,597,049, 3,734,600, 4,412,726, 3,737,214, 3,741,630, 6,844,991, and JP patent 63-017421, and 60-153018. The number of lens elements ranges from 8 to 12 in those designs.

SUMMARY OF THE INVENTION

The present invention teaches the design of a fisheye objective lens with only 6 lens elements. The fisheye objective lens receives light from an object in object space and forms an image of the object on an image plane. The objective lens and the image plane are contemplated to be part of a surveillance system that derives a benefit and a sales advantage from very small size, high image quality and good low light performance.

The fisheye objective lens has a first lens group comprising 3 elements. The first lens element that has a convex object surface that faces an object or a scene positioned in object space. The first lens element has a concave image surface that faces the image plane. A second lens element has a convex object surface that faces the object and a concave image surface that faces the image plane. A third lens element has a positive power. The second lens group also has 3 elements consisting of a doublet (with two lens elements cemented together using suitable optical glue) and a singlet element. Both the doublet and the singlet have positive optical power. The lens elements are coaxially aligned and spaced to obtain a ratio of TT to fo between 8 and 15. The symbol "TT" designates the distance between the vertex of the first lens element convex object surface and the image plane when the fisheye lens is focused at infinity. This dimension is also referred to as the height of the objective lens. The symbol "fo" designates the focal length of the entire fisheye objective lens assembly. The upper limit specifies the compactness of the fisheye lens. If the upper limit is exceeded the lens is no longer considered compact. If the lower limit is exceeded the lens would not achieve the required the fisheye field of view.

In the first embodiment, the lens elements in the second group is arranged such that the doublet is on the object side, and the singlet is on the image side. In the second embodiment the order of doublet and the singlet is reversed.

BRIEF DESCRIPTIONS OF THE DRAWINGS

PREFERRED EMBODIMENT

Figure 1:
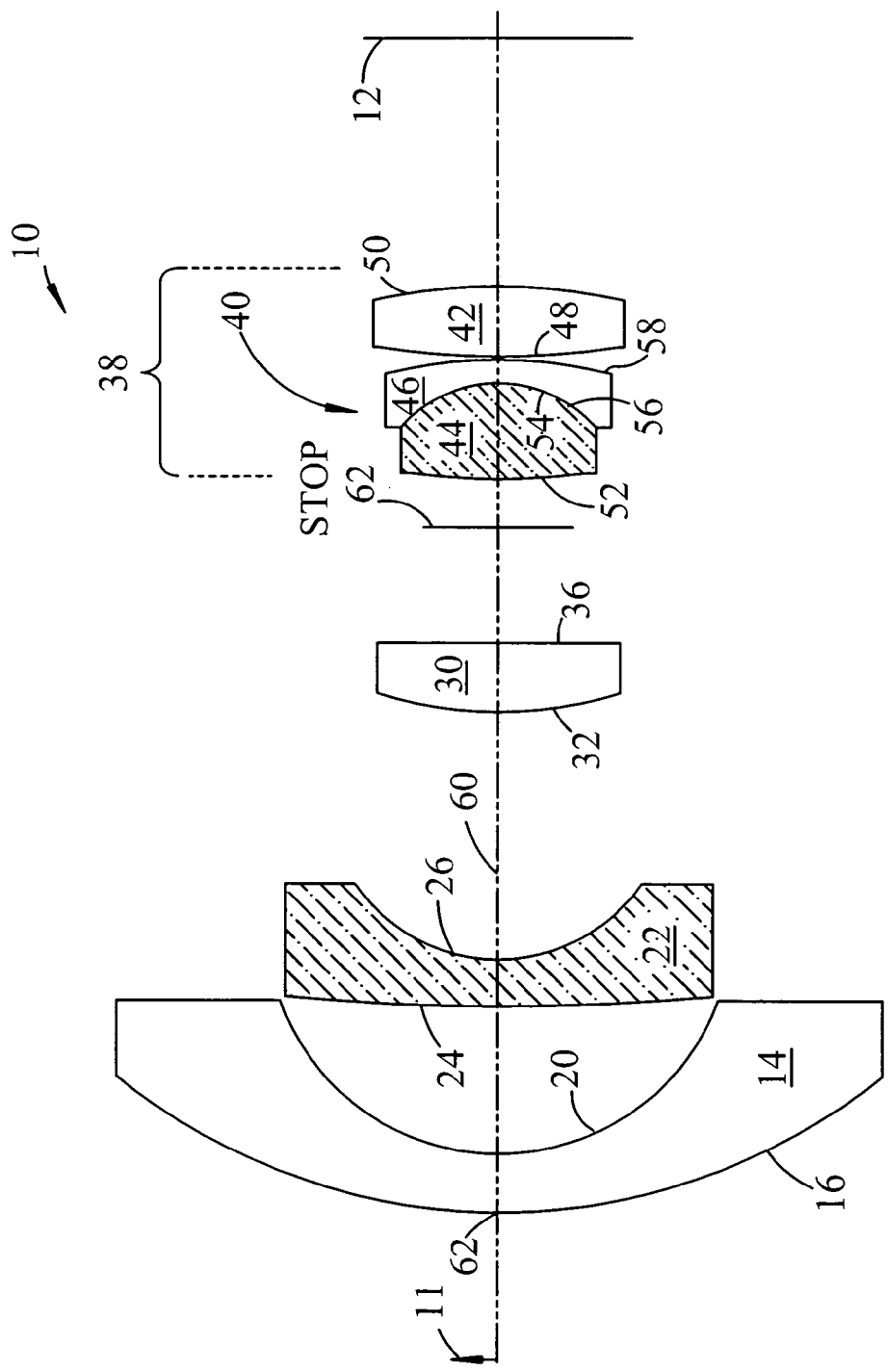
FIG. 1 is a schematic side view of the first embodiment of the disclosed six element fisheye objective lens.

FIG. 1 shows a first embodiment of a fisheye objective lens 10 that receives light from an imaginary object 11 in object space from which it forms an image of the object on an image plane 12. The embodiment of FIG. 1 and the embodiment of FIG. 3 have similar lens arrangements for the first three lenses. The description of the first three lenses in FIG. 1 to follow can be read to apply to the first three lenses of the embodiment of FIG. 3.

Figure 3:
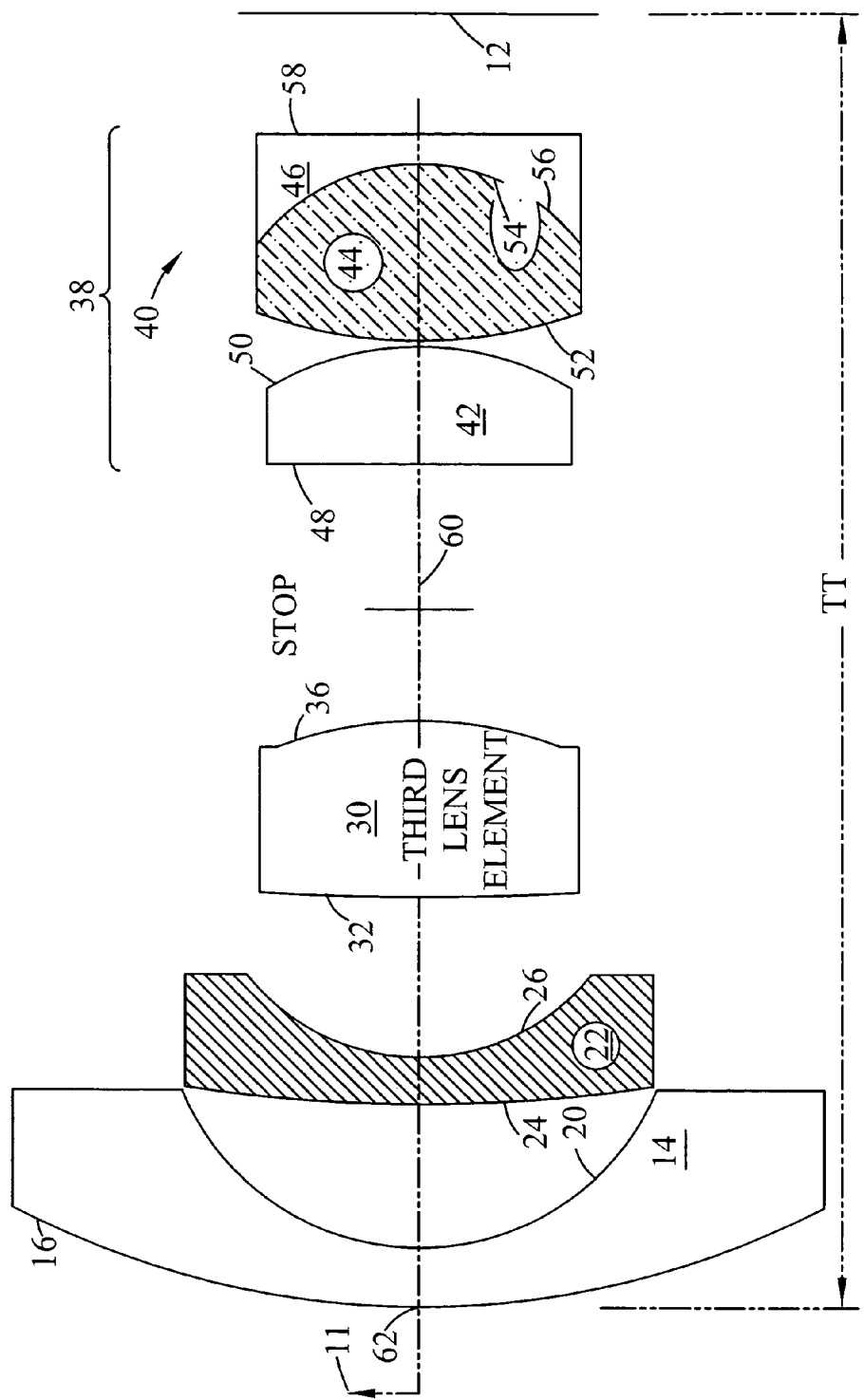
FIG. 3 is a schematic side view of a second embodiment of the six element fisheye objective lens.

Referring to FIG. 1 and FIG. 3, the fisheye objective lens 10 has a first lens element 14 with a convex object surface 16 that faces the object and a concave image surface 20 that faces image plane 12. In identifying the surfaces of the lens elements in FIG. 1, the word "object" is used as an adjective before the word "surface" to identify a surface that faces the imaginary object 11 positioned at the left of the FIG. 1 and FIG. 3 sight windows. The word "image" is used as an adjective before the word "surface" to identify a surface that faces the image plane 12.

A second lens element 22 is shown spaced to the right of the first lens element concave image surface 20. The second lens element 22 has a convex object surface 24 and a concave image surface 26.

A third lens element 30 is shown spaced to the right of the second lens element 22. The third lens element 30 has a convex object surface 32 facing the concave image surface 26 and an image surface 36. The third lens has a positive power.

In the embodiments of both FIG. 1 and FIG. 3, the third lens is followed by positively powered lens group depicted under bracket 38. The lens group 38 is formed from a positively powered cemented doublet 40 and a singlet lens 42. The order of sequence for the doublet 40 and the singlet lens 42 is reversed in the embodiment of FIG. 3.

In both embodiments, the cemented doublet 40 is formed from a doublet first lens 44 and a doublet second lens 46. The singlet lens element 42 has a convex object surface 48 and a convex image surface 50. The singlet lens 42 has a positive power in both the first embodiment of FIG. 1 and the second embodiment of FIG. 2.

The lens group 38 in the embodiment of FIG. 1 has an object surface formed by the doublet first lens object surface 52. In the embodiment of FIG. 3, the lens group has an object surface formed by the singlet lens object surface 48. In the embodiment of FIG. 1, the lens group 38 has an image surface formed by the singlet lens image surface 50 and in the embodiment of FIG. 3, the lens group has an image surface formed by the doublet second lens image surface 58.

In the embodiments of FIG. 1 and FIG. 3, line 60 is pictured on the optical axis. The first, second, third, the doublet lens and the singlet lens are coaxially aligned on the optical axis 60.

A principle performance objective in the design of the fisheye objective lens of FIGS. 1 and 3 was to achieve excellent optical performance over 180 deg field of view with a f/# as low as 2.0 and with a minimum number of lens elements. The f/# is the ratio of the the focal length "fo" divided by the pupil diameter of the lens assembly. The availability of optical grade glass materials with higher index of refraction and suitable Abbe numbers than had become available in the recent past made it possible to contemplate that a fisheye objective lens with excellent optical performance characteristics might be designed with a smaller number of lenses than had been thought necessary in the past. The higher index materials are particularly useful in the first three elements in the present invention. The primary function of the first three elements is to reduce the field of view from about +/−90 deg to something much less (for example, +/−30 deg). Higher index materials allow this reduction in field of view without introducing excessive aberrations such as field curvature and astigmatism. The availability of high index materials with suitable Abbe numbers also allows for a better correction of chromatic aberrations presented in the first three elements.

Several commercial software packages (examples include: Code V marketed by Optical Research Associates in Pasadena, Calif. and Zemax marketed by Zemax Corporation in San Diego, Calif.) are available for designing and analyzing the performance of fisheye lenses. The designs of FIG. 1 and FIG. 3 were the lens layouts obtained using Zemax software. The prescription for the design in FIG. 1 appears in Table 1. The prescription for the design of FIG. 3 appears in Table 2. The modeled performance of the design of FIG. 1 appears in 8 graphs on FIG. 2. The modeled performance of the design of FIG. 3 appears in 8 graphs on FIG. 4.

Figure 2:
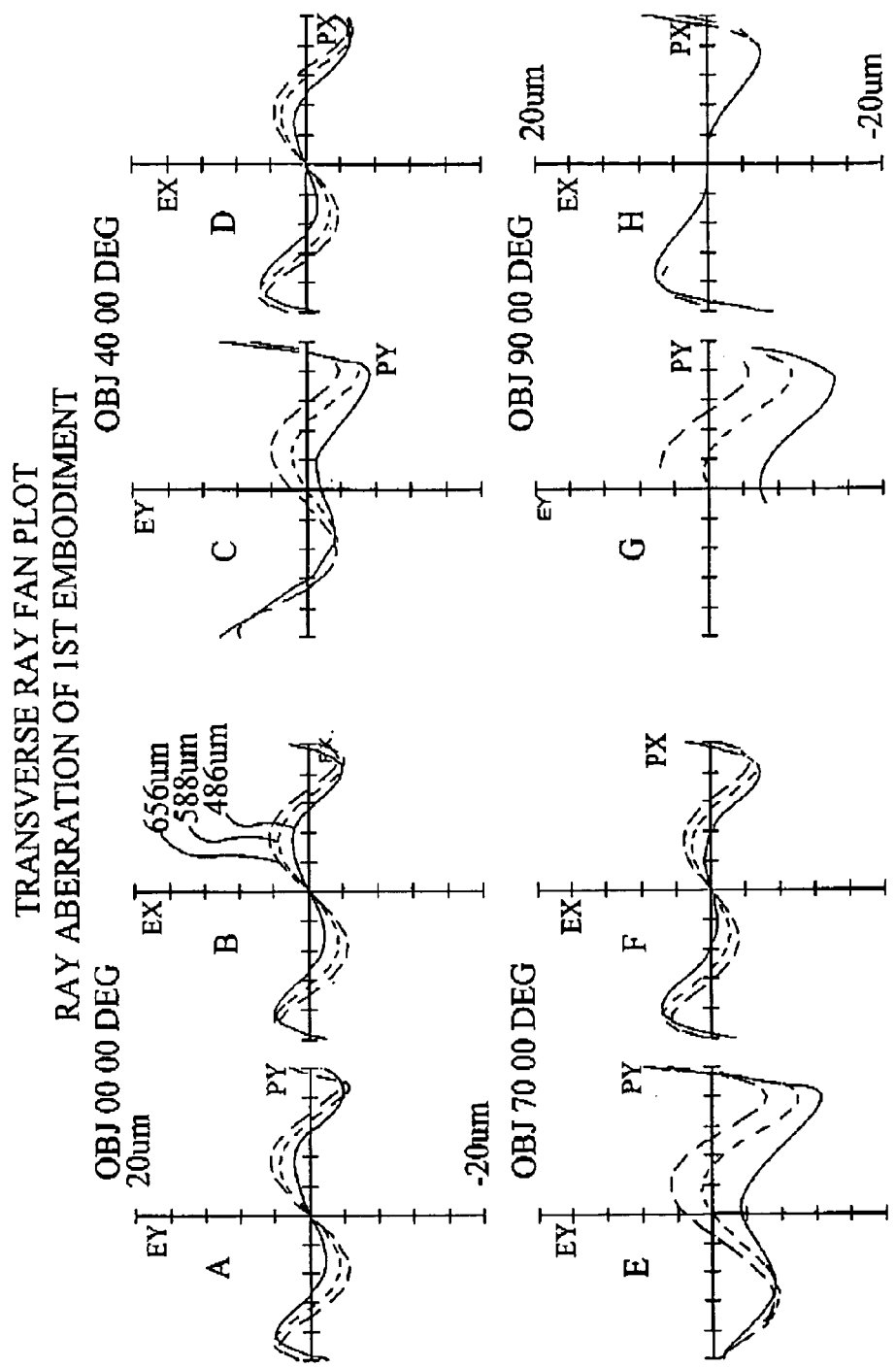
FIG. 2 represents transverse ray aberrations of the first embodiment. The y-scale is 4☐m per division.

FIG. 2 shows eight graphs labeled A, B, C, D, E, F, G and H which are arrayed in four pair. The independent variable (horizontal axis) is the relative coordinate of a ray over the pupil diameter. The vertical axis has a maximum distance measure of +/−20 um (each tic mark is 4 um). The vertical axis therefore represents the transverse ray aberration (ray interception distance from the ideal focal point) of a ray passing through a specific relative pupil position. Graphs A (tangential plane) and B (saggital plane) show the transverse ray aberrations for an on-axis ray bundle. Graphs C and D to the right of Graphs A and B show the performance of the lens for a ray bundle at 40 degrees off-axis with respect to the optical axis 60. Graphs E and F increase the incident angle to 70 degrees and Graphs G and H show the performance when the light source is moved provide an incident angle of 90 degrees with respect to the optical axis of the lens. Three curves appear on each of the eight Graphs. Each of the curves show the performance of the lens at a different wavelength. Referring to Graph A on FIG. 1, curve J represents the aberration performance of the lens with light at 656 nm, curve K represents the performance at 588 nm and curve L represents the performance of the lens with light at 486 nm.

Table 1 shows the prescription for the preferred embodiment of FIG. 1 and Table 2 shows the prescription of the preferred embodiment of FIG. 2. The heading of each table shows the focal length of the particular embodiment, the track or total height (TT) of the lens, the calculated ratio of TT/fo, the full field of view in degrees and the F/# for the particular embodiment.

The columns are titled for: Surface number, Comment, Radius (a column for the radii measured in mm), Thickness (a column or a separation distance column to the next lens vertex measured in millimeters), Index (the index of refraction column for the glass material at 588 nm) and Abbe Number. By way of example, at the first row of Table 2, the table shows that the first lens element has an index of refraction in excess of 1.75 at wavelength of 588 nm. At row 5, Table 2 shows that the third lens is made from glass that has an index of refraction of 1.74 at 588 nm. The heading area of Table 1 shows that the ratio of TT/fo for the first embodiment of FIG. 1 has a calculated value of 11.7 and Table 2 shows that the ratio of TT/fo for the second embodiment of FIG. 2 has a calculated value of 12.0. The two ratios were calculated for lenses with field of view of at least 170 degrees. Using the materials available, it is believed that based on the modeling performed, it will be possible to obtain a height to focal length ratio within a range 8<TT/fo<15, where TT designates the distance between the vertex 62 on the first lens element convex object surface 16 and the image plane 12 when the fisheye lens is focused at infinity and where "fo" designates the focal length of the fisheye objective lens 10.

Table 1 and Table 2 also show the lens designs to be dependent on the Abbe number of glass material. At row 1, Table 1 shows that the Abbe number of the first lens element of FIG. 1 is 35.47. At row 5, the same table shows that the Abbe number for the third lens element is 21.51. Table 2, row 1, shows that the Abbe number of the first lens element of FIG. 3 is 52.32. At row 5, the same table shows that the Abbe number for the third lens element is 44.98. From the foregoing, it appears that first lens element has an Abbe number that exceeds the Abbe number of the third lens in each case.

At row 3, Table 1 shows that the Abbe number of the second lens element of FIG. 1 is 46.61. At row 5, the same table shows that the Abbe number for the third lens element is 21.51. Table 2, row 3 shows that the Abbe number of the second lens element of FIG. 3 is 54.67. Row 5 of the same table shows that the Abbe number for the third lens element is 44.98. Therefore, the second lens element has an Abbe number that exceeds the Abbe number of the third lens in each case. From the preceding, it therefore appears that the second lens element has an Abbe number that generally exceeds the Abbe number of the first lens element.

An alternative characterization of the lens elements in the lens group 38 in FIG. 1 is made by referring to the doublet first lens element as the fourth lens element 44. The fourth lens element would therefore also have an object surface 52 and an image surface 54. The fourth lens element object surface 52 faces the object and the image surface 54 faces the image plane 12. In this arrangement, the doublet second lens element 46 is described as a fifth lens element 46. The fifth lens element has an object surface and an image surface. The fifth lens element object surface 56 faces the object and the image surface 58 faces the image plane 12. The fifth lens element object surface 56 is cemented to the fourth lens element image surface 54.

To be consistent with this characterization, the singlet lens 42 is characterized as the sixth lens element 42 having an object surface 48 and an image surface 50. The sixth lens element object surface 48 faces the object. The sixth lens element image surface 50 faces the image plane. The sixth lens element 42 has a positive power. In this characterization, the fisheye lens elements are all coaxially aligned and spaced. The fourth and the fifth lens elements are cemented optically to form the doublet element 40.

The first embodiment of the fisheye objective lens is made using the prescription found in Table 1 below. Table 1 has a OBJ row which stands for the object in object space. The radius of the image of the object is infinite because the object is at a great distance from the vertex 62 on object surface of the first lens 14. The Thickness column shows the distance from the object to vertex 62 to be infinite. Row 1 characterizes the first lens 14. Surface (16) has a radius of 9.99 mm. The lens thickness at the vertex is 1.0 mm. The Index of Refraction is 1.910 and the Abbe Number is 35.47. On row 2, the value 1.98 appears in the Thickness column. This value represents the distance from the vertex on surface 20 to the vertex on second lens element object surface 24. The radius of the first lens element image surface is 4.15 mm which is more than double the distance from the vertex of the image surface 20 to the image surface 24.

Rows 6 and 7 characterizes the location of the STOP as being 1.62 mm from the vertex of surface 36 and 0.62 mm from the vertex of surface 52. Row 13 characterizes a glass cover for the image plane as having a thickness of 0.40 mm and an index of refraction of 1.516. Row 14 characterizes the distance of the cover as being 0.55 mm from the image plane. Row IMA is the row for the image plane.

TABLE 1

Focal length fo = 1.68, Total track TT = 20.2
TT/fo = 12, Full field of view = 180 deg, F/# = 2.0

| Surf | Comment | Radius | Thickness | Index at 588 nm | Abbe Number |
|---|---|---|---|---|---|
| OBJ | | Infinity | Infinity | | |
| 1 | (14) (16) LENS 1 | 9.99 | 1.00 | 1.910 | 35.47 |
| 2 | (14) (20) | 4.15 | 1.98 | | |
| 3 | (22) (24) LENS 2 | 17.42 | 0.80 | 1.816 | 46.61 |
| 4 | (22)...(26) | 3.07 | 5.32 | | |
| 5 | (30) (32) LENS 3 | 6.26 | 1.14 | 1.917 | 21.51 |
| 6 | (30) (36) | 39.78 | 1.56 | | |
| 7 | | Infinity | 0.62 | | |
| 8 | LENS 4 Doublet (44)(52) | 9.81 | 1.82 | 1.729 | 54.67 |
| 9 | (44) (54) LENS 5 | −2.20 | 0.40 | 1.917 | 21.51 |
| 10 | (46) (58) | −6.95 | 0.06 | | |
| 11 | Singlet (42) (48) LENS 6 | 45.11 | 1.03 | 1.640 | 60.15 |
| 12 | (42) (50) | −10.04 | 3.50 | | |
| 13 | Sensor cover glass | Infinity | 0.40 | 1.516 | 64.17 |
| 14 | | Infinity | 0.55 | | |
| IMA | | Infinity | | | |

An alternative characterization of the lens elements in the lens group 38 in FIG. 3 is made by referring to the singlet lens 42 as the fourth sixth lens element 42 having an object surface 48 and an image surface 50. The fourth lens element object surface 48 faces the object. The fourth lens element image surface 50 faces the image plane 12. The fourth lens element 42 also has a positive power.

The doublet 40 first lens element 44 is the fifth lens element 44. The fifth lens element would therefore also have an object surface 52 and an image surface 54. The fifth lens element object surface 52 faces the object and the image surface 54 faces the image plane 12. In the embodiment of FIG. 3 and Table 2, the doublet 40 second lens element 42 is described as a sixth lens element 42. The sixth lens element has an object surface and an image surface. The sixth lens element object surface 56 that faces the object and an image surface 58 faces the image plane 12. The sixth lens element object surface 56 is cemented to the fifth lens element image surface 54.

In this alternative characterization, as in the characterization of the arrangement of FIG. 1, the fisheye lens elements are all coaxially aligned and spaced. The fifth and the sixth lens elements are cemented optically to form the doublet element 40.

A second embodiment of the fisheye objective lens is made using the prescription found in Table 2 below.

Table 2 is similar to Table 1 above. Table 2, has a OBJ row which stands for the object in object space. The radius of the image of the object is infinite because the object is at a great distance from the vertex 62 on object surface of the first lens 14. The Thickness column shows the distance from the object to vertex 62 to be infinite. Row 1 characterizes the first lens 14. Surface (16) has a radius of 14.56 mm. The lens thickness at the vertex is 1.0 mm. The Index column 1.754 and the Abbe Number is 52.32. On row 2, the value 2.44 appears in the Thickness column. This value represents the distance from the vertex on surface 20 to the vertex on second lens element object surface 24. The radius of the first lens element image surface is 4.30 which is more than double the distance from the vertex of the concave image surface 20 to the vertex on convex object surface 24.

Rows 5 and 6 characterize the third lens element in Table 2 and the Index column shows that the index of refraction of the third element 30 is 1.744 at 588 nm. Rows 6 and 7 characterizes the location of the STOP as being 1.89 mm from the vertex of surface 36 and 2.48 mm from the vertex of surface 48. Row 13 characterizes a glass cover for the image plane as having a thickness of 0.55 mm and an index of refraction of 1.516. Row 14 characterizes the distance of the cover as being 0.50 mm from the image plane.

The title block of Table 2 shows that the calculated ratio of TT/fo is 11.7 for the embodiment of FIG. 3. The value of 11/7 is within the claimed range for TT/fo of 8<TT/fo<15 for the configuration of six elements shown, where TT designates the height of the lens as a distance between the vertex of the first lens convex object surface and the image plane when focused at infinity, and fo designates the focal length of the fisheye objective lens.

Since the first three elements of the FIG. 1 and FIG. 3 is equivalent, reference to Table 2 will show that the first lens element has a Abbe number that exceeds the Abbe number of the third lens, and that the second lens element has a Abbe number that exceeds the Abbe number of the first lens.

Figure 4:
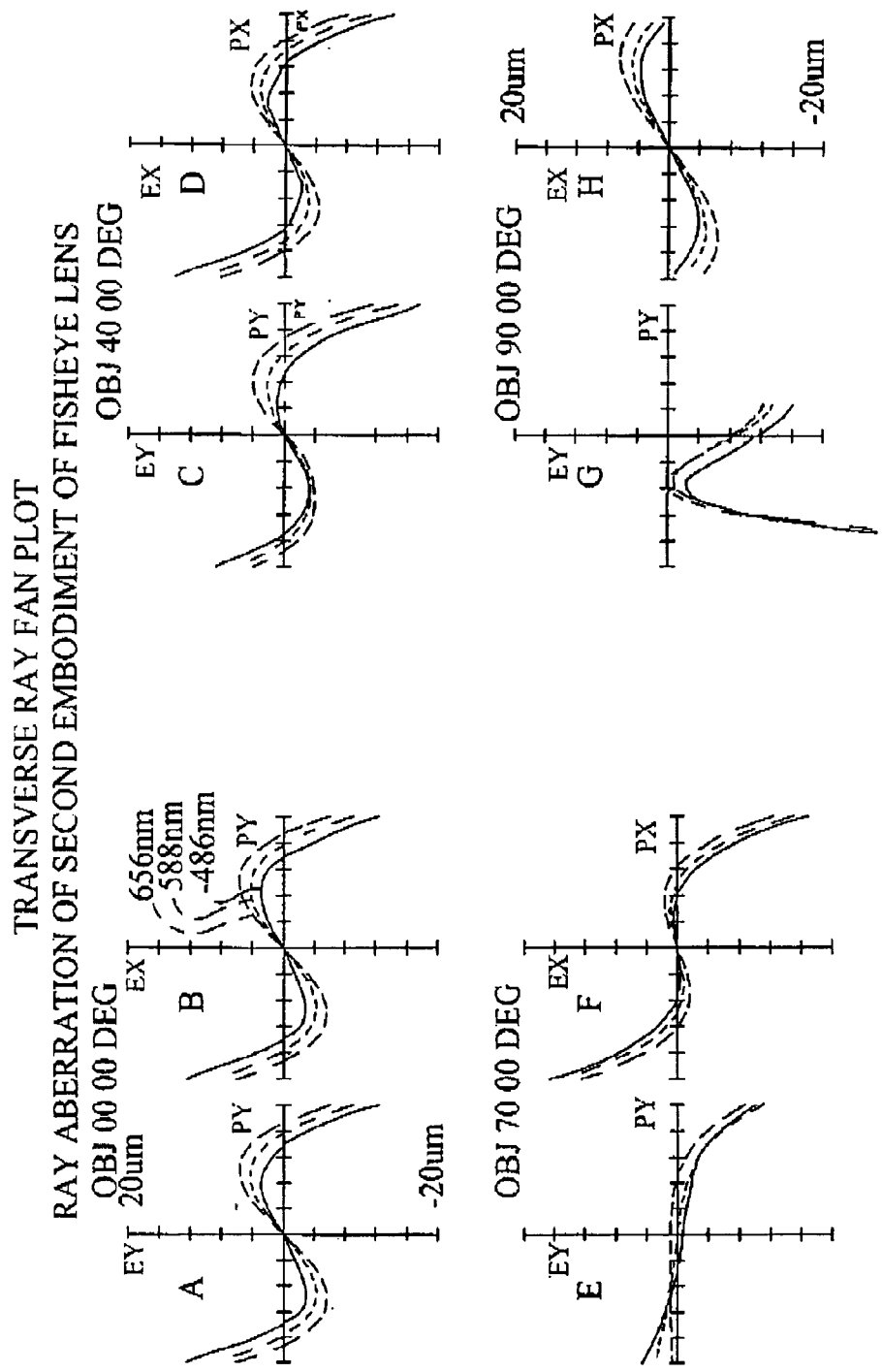
FIG. 4 represents transverse aberrations of the second embodiment in which the y-scale is 4☐m per division.

The Graphs of FIG. 4 show the performance of the embodiment of FIG. 3 when modeled with the prescription of Table 2 below. The explanation of the Graphs of FIG. 4 is similar to that provided above for the Graphs of FIG. 2.

TABLE 2

Focal length fo = 1.97, Total track TT = 23.02
TT/fo = 11.7, Full field of view = 170 deg, F/# = 3.0

| Surf | Comment | Radius | Thickness | Index at 588 nm | Abbe Number |
|---|---|---|---|---|---|
| OBJ | | Infinity | Infinity | | |
| 1 | (14) (16) LENS1 | 14.56 | 1.00 | 1.754 | 52.32 |
| 2 | (14) (20) | 4.30 | 2.44 | | |

TABLE 2-continued

Focal length fo = 1.97, Total track TT = 23.02
TT/fo = 11.7, Full field of view = 170 deg, F/# = 3.0

| Surf | Comment | Radius | Thickness | Index at 588 nm | Abbe Number |
|---|---|---|---|---|---|
| 3 | (22) (24) LENS2 | 25.77 | 0.80 | 1.729 | 54.67 |
| 4 | (22) (26) | 3.71 | 2.72 | | |
| 5 | (30) (33) LENS3 | 43.98 | 3.00 | 1.744 | 44.98 |
| 6 | | −6.70 | 1.89 | | |
| 7 | STOP | Infinity | 2.48 | | |
| 8 | (42) (48) LENS 4 | Infinity | 2.00 | 1.640 | 60.15 |
| 9 | (42) (50) | −4.96 | 0.10 | | |
| 10 | (44) (52) LENS 5 | 8.01 | 3.00 | 1.729 | 54.66 |
| 11 | (46) (56) LENS 6 | −3.41 | 0.50 | 1.917 | 21.51 |
| 12 | (46) (58) | Infinity | 2.04 | | |
| 13 | COVER | Infinity | 0.55 | 1.516 | 64.17 |
| 14 | | Infinity | 0.50 | | |
| IMA | | Infinity | | | |

While certain specific relationships, materials and other parameters have been detailed in the above description of preferred embodiments, those can be varied, where suitable, with similar results. Other applications and variations of the present invention will occur to those skilled in the art upon reading the present disclosure. Those variations are also intended to be included within the scope of this invention as defined in the appended claims.

What is claimed is:

1. A fisheye objective lens for receiving light from an object and for forming an image of the object on an image plane, the objective lens comprising:
   a first lens element having a convex object surface facing the object and a concave image surface facing the image plane,
   a second lens element having a convex object surface facing the object and a concave image facing the image plane,
   a third lens element having a positive power, and
   a positively powered lens group having a positively powered cemented doublet lens pair and a singlet lens element having a positive power, the lens group having an object surface facing the object and an image surface facing the image,
   the fisheye objective lens having an optical axis, the first, second, third and the lens group being coaxially aligned on the optical axis; and wherein,
   the fisheye objective lens has a height to focal length ratio within a range 8<TT/fo<15, where TT designates the distance between the vertex of the first lens element convex object surface and the image plane when focused at infinity, and where fo designates the focal length of the fisheye objective lens.

2. The fisheye objective lens of claim 1 wherein:
   the first lens element has an index of refraction in excess of 1.75 at wavelength of 588 nm.

3. The fisheye objective lens of claim 1 wherein:
   the third lens element has an index of refraction in excess of 1.74 at a wavelength of 588 nm.

4. The fisheye objective lens of claim 1 wherein:
   the first lens element has an Abbe number that exceeds the Abbe number of the third lens.

5. The fisheye objective lens of claim 1 wherein:
   the second lens element has an Abbe number that exceeds the Abbe number of the first lens.

6. A fisheye objective lens for receiving light from an object and for forming an image of the object on an image plane, the objective lens comprising:
   a first lens element having a convex object surface facing the object and a concave image surface facing the image plane,
   a second lens element having a convex object surface facing the object and a concave image surface facing the image plane,
   a third lens element having a positive power, and
   a fourth lens element having an object surface and an image surface, the fourth lens element object surface facing the object and the image surface facing the image plane,
   a fifth lens element having an object surface and an image surface, the fifth lens element object surface facing the object and the image surface facing the image plane,
   a sixth lens element having an object surface and an image surface, the sixth lens element object surface facing the object, the sixth lens element image surface facing the image plane, the sixth lens element having a positive power,
   the fisheye lens elements all being coaxially aligned and spaced,
   the fourth and the fifth lens elements being cemented optically to form a doublet element and wherein,
   the first lens element has an index of refraction in excess of 1.9 at wavelength of 588 nm.

7. A fisheye objective lens for receiving light from an object and for forming an image of the object on an image plane, the objective lens comprising:
   a first lens element having a convex object surface facing the object and a concave image surface facing the image plane,
   a second lens element having a convex object surface facing the object and a concave image facing the image plane,
   a third lens element having a positive power, and
   a fourth lens element having an object surface and an image surface, the fourth lens element object surface facing the object and the image surface facing the image plane,
   a fifth lens element having an object surface and an image surface, the fifth lens element object surface facing the object and the image surface facing the image plane,
   a sixth lens element having an object surface and an image surface, the sixth lens element object surface facing the object, the sixth lens element image surface facing the image plane, the sixth lens element having a positive power,
   the fisheye lens elements all being coaxially aligned and spaced,
   the fourth and the fifth lens elements being cemented optically to form a doublet element and wherein, the third lens element has an index of refraction in excess of 1.9 at wavelength of 588 nm.

8. A fisheye objective lens for receiving light from an object and for forming an image of the object on an image plane, the objective lens comprising:
   a first lens element having a convex object surface facing the object and a concave image surface facing the image plane, a second lens element having a convex object surface facing the object and a concave image facing the image plane, a third lens element having a positive power, and a fourth lens element having an object surface and an image surface, the fourth lens element object surface facing the object and the image surface facing the image plane, a fifth lens element having an object surface and an image surface, the fifth lens element object surface facing the object and the image surface facing the image plane, a sixth lens element having an object surface and an image surface, the sixth lens element object surface facing the object, the sixth lens element image surface facing the image plane, the sixth lens element having a positive power, the fisheye lens elements all being coaxially aligned and spaced, the fourth and the fifth lens elements being cemented optically to form a doublet element and wherein, the fisheye objective lens has a height to focal length ratio within a range such that 8<TT/fo<15, where TT designates the distance between the vertex of the first lens convex object surface and the image plane when focused at infinity, and fo designates the focal length of the fisheye objective lens.

9. The fisheye objective lens of claim 6 wherein:
the first lens element has a Abbe number that exceeds the Abbe number of the third lens element.

10. The fisheye objective lens of claim 6 wherein:
the Abbe number of the second lens element is greater than the Abbe number of the first lens element.

11. A fisheye objective lens for receiving light from an object and for forming an image of the object on an image plane, the objective lens comprising:

a first lens element having a convex object surface facing the object and a concave image surface facing the image plane, a second lens element having a convex object surface facing the object and a concave image facing the image plane, a third lens element having a positive power, a fourth lens element having an object surface and an image surface, the fourth lens element object surface facing the object and the image surface facing the image plane, the fourth lens element having a positive power, a fifth lens element having an object surface and an image surface, the fifth lens element object surface facing the object and the image surface facing the image plane, a sixth lens element having an object surface and an image surface, the sixth lens element object surface facing the object and the image surface facing the image plane, the fisheye lens elements all being coaxially aligned and spaced, the fifth and the sixth lens elements being optically cemented to form a doublet lens element; and wherein, the fisheye objective lens has a height (TT) to focal length (fo) ratio within a range of 8<TT/fo<15, where TT designates the height of the lens as a distance between the vertex of the first lens convex object surface and the image plane when focused at infinity, and fo designates the focal length of the fisheye objective lens.

12. The fisheye objective lens of claim 11 wherein:
the first lens element has an index of refraction in excess of 1.75 at wavelength of 588 nm.

13. The fisheye objective lens of claim 11 wherein:
the third lens element has an index of refraction in excess of 1.74 at wavelength of 588 nm.

14. The fisheye objective lens of claim 11 wherein:
the first lens element has a Abbe number that exceeds the Abbe number of the third lens.

15. The fisheye objective lens of claim 11 wherein:
the second lens element has a Abbe number that exceeds the Abbe number of the first lens.

* * * * *